June 3, 1958
D. E. STEER
2,837,134
TUBELESS TIRE VALVE STEM
Filed Oct. 28, 1953
2 Sheets-Sheet 1
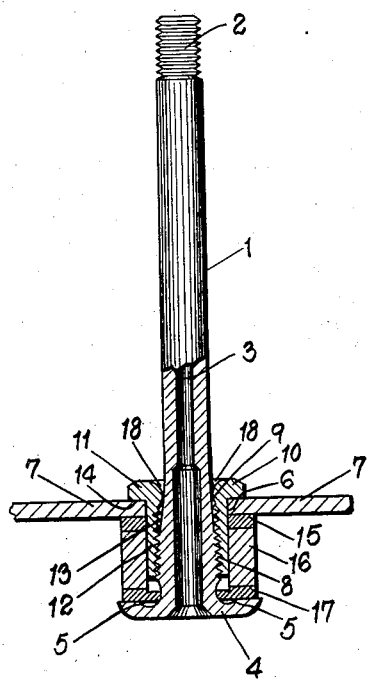
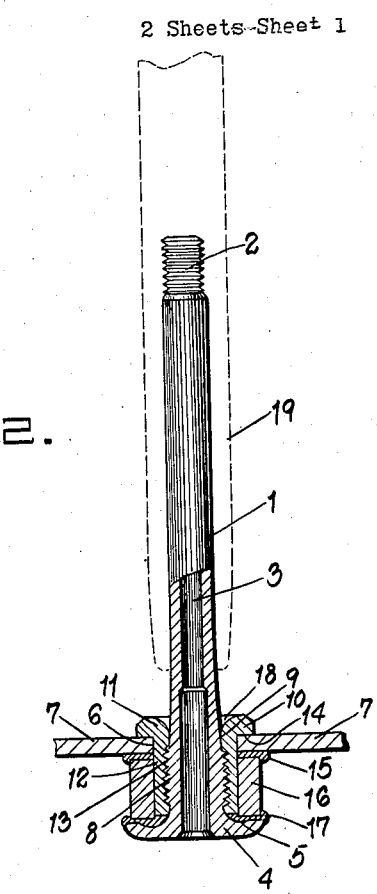
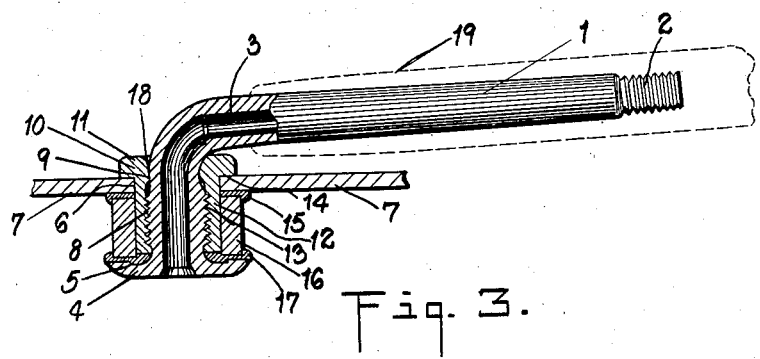
INVENTOR.
Donald E. Steer
BY
Kenyon & Kenyon
Attorneys

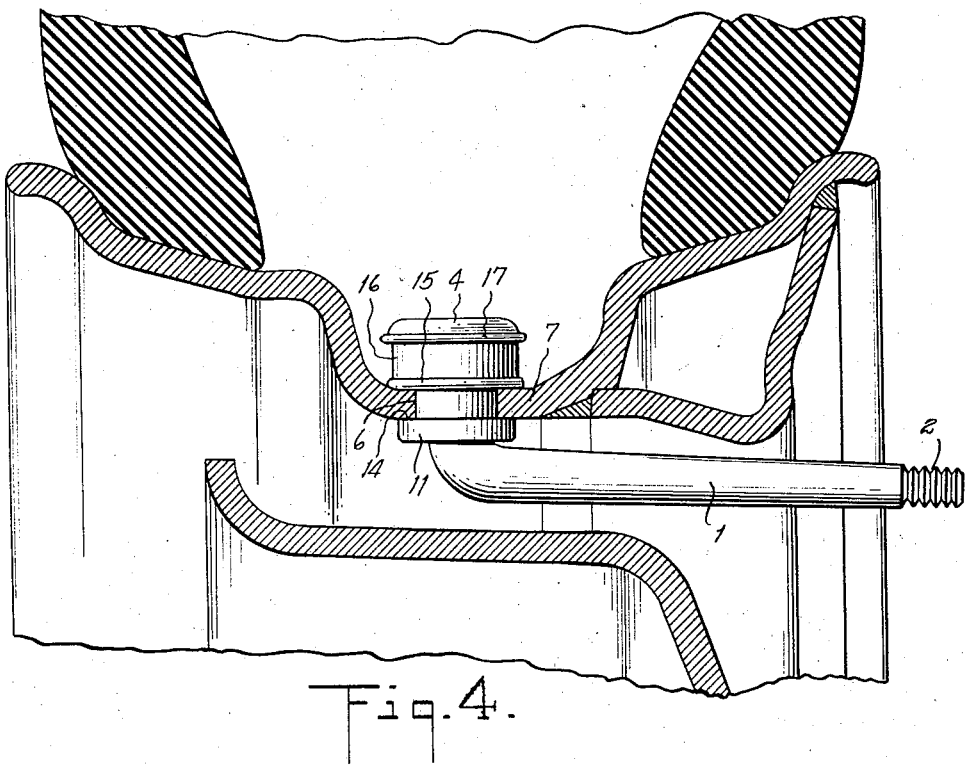

United States Patent Office 2,837,134
Patented June 3, 1958

2,837,134

TUBELESS TIRE VALVE STEM

Donald E. Steer, Stratford, Conn., assignor to Bridgeport Brass Company, Bridgeport, Conn., a corporation of Connecticut Application October 28, 1953, Serial No. 388,762

5 Claims. (Cl. 152—427)

The present invention relates to a valve stem assembly for use with tubeless tires and particularly to a valve stem assembly for use with tubeless truck tires where it is essential that the exposed section of the valve stem be bent close to the rim to avoid brake drum interference.

The objects of this invention are to provide an easily assembled tubeless tire valve assembly that will be air tight when attached to the wheel rim and to provide a tubeless tire valve assembly that facilitates the bending of the exposed portion of the stem to a position close to the wheel rim to avoid brake drum interference.

Further objects of the invention will be apparent from a reference to the specification herein and the accompanying drawings.

In said drawings:

Fig. 1 is a fragmentary cross section through a wheel rim, valve stem and valve stem mounting assembly before the bushing nut has been tightened to compress the sealing washers to hold and seal the valve stem on the wheel rim;

Fig. 2 is a fragmentary cross section through a wheel rim, valve stem and valve stem mounting assembly after the bushing nut has been tightened to compress the sealing washers; and Fig. 3 is a fragmentary cross section through a wheel rim, valve stem and valve stem assembly in tightened position with the exposed portion of the valve stem bent near the wheel rim.

Figure 4 is a fragmentary cross section through a tire wheel rim, brake drum, valve stem and valve stem assembly in tightened position with the exposed portion of the valve stem bent near the wheel rim.

The valve stem 1 is relatively long and made of bendable material. It is formed with an externally threaded portion 2 at its outer or upper end and also with a bore 3 extending longitudinally therethrough. The inner or lower end of the valve stem 1 is formed or provided with an integral annular flange 4 which is concaved at its upper surface to provide a circular lip 5. The valve stem as a whole is adapted to extend through an aperture or hole 6 in the metallic wheel rim 7, the annular flange being located within the wheel rim 7 with the circular lip 5 facing the inner surface of said wheel rim 7. Said valve stem 1 is also provided with an externally threaded portion 8 adjacent said annular flange 4, which portion 8 is of greater diameter than the diameter of the remaining and longer portion of valve stem 1. The upper part of said threaded portion 8 merges into the body of the stem 1 in the form of a sloping shouldered portion 9.

A bushing nut 10 has a circular or annular flange or head 11 extending around the outer circumference thereof and an extended barrel portion 12 which is internally threaded as at 13, said threaded portion 13 being complementary to the threaded portion 8 of the lower part of the valve stem 1. The bushing nut is positioned so that the barrel portion extends through the opening or aperture in the rim and the flat shoulder surface 14 of the flange or head 11 rests upon and engages the outer surface of the wheel rim 7 at the edge of said aperture or hole 6.

A sealing washer 15 fits around the outside of the barrel portion 12 of the bushing nut 10 and against the inner surface of the wheel rim adjacent the edge of the aperture or hole 6. It is supported in position by a spacing member or collar 16 which rests upon a second sealing washer 17 which is positioned around the lower or inner portion of the valve stem and against the upper surface of the flange 4 and the circular lip 5 thereof.

It is seen that when the bushing nut 10 is turned downwardly to bind the stem, the flange 4 with its circular lip 5 will be drawn toward the wheel rim 7 to such an extent that the spacing member or collar 16 will force the sealing washer 15 against the inner surface of the rim and the second or lower sealing washer 17 will be tightly engaged and sealed between the upper face of the flange 4 and its lip 5 and the lower end surface of the spacing member or collar 16. This provides a completely sealed and leak-proof attachment and engagement between the stem 1 and the rim 7.

It is to be noted that the hole or aperture in the upper or outer portion of the bushing nut 10 is formed so that its inner edge surface is rounded as indicated at 18. This rounded edge portion 18 is adapted to act as a bending block over which the valve stem may be readily bent by a pipe or other tool without injuring the valve stem or displacing or loosening the tightened assembly. As seen in Figs. 2 and 3 of the drawing, such a pipe is indicated in dotted lines as at 19. Such pipe may be of any length to provide the necessary leverage to bend the valve stem so that it lies near the wheel rim as shown in Fig. 3 of the drawing. Of course, any other suitable tool may be used for this purpose. This positioning of the valve stem close to the wheel rim is very important in tubeless truck tire and wheel assemblies where the brake drum extends over the inner circumference of the wheel rim. The present valve stem assembly is rugged enough to guarantee an air-tight closure around the valve stem both before and after the stem is bent.

Variations may be made within the scope of the invention as it is defined in the following claims.

I claim:

1. A tubeless tire valve stem assembly comprising a valve stem adapted to extend through a hole in the rim of a wheel, a flange integrally attached to the valve stem extending around the outer circumference of the end of the valve stem inside the rim, a lip integrally attached to the flange extending around its outer circumference, the portion of the valve stem immediately adjacent the flange being externally threaded, an internally threaded bushing nut adapted to extend down through the hole in the rim to thread onto the threads of the valve stem, a flange integrally attached to the outer end of the bushing nut and adapted to engage the rim at the edge portion around the hole, a pair of sealing washers and a spacer washer, one sealing washer positioned between the rim and the spacer washer, the other sealing washer positioned between the spacer washer and the valve stem flange, the sealing washers and spacer washer held in position by means of the engagement and tightening of the bushing nut threads with the valve stem threads.

2. A tubeless tire valve stem assembly comprising a valve stem adapted to extend through a hole in the rim of a wheel, a flange integrally attached to the valve stem extending around the outer circumference of the end of the valve stem inside the rim, a lip integrally attached to the flange extending around its outer circumference, the portion of the valve stem immediately adjacent the flange being externally threaded, an internally threaded bushing nut adapted to extend down through the hole in the rim to thread onto the threads of the valve stem, a flange integrally attached to the outer end of the bushing nut and adapted to engage the rim at the edge portion around the hole, the inner circumference of the bushing nut positioned outside the rim adjacent the bushing nut flange adapted to act as a bending block for bending the valve stem, a pair of sealing washers and a spacer washer, one sealing washer positioned between the rim and the spacer washer, the other sealing washer positioned between the spacer washer and the valve stem flange, the sealing washers and spacer washer held in position by means of the engagement and tightening of the bushing nut threads with the valve stem threads.

3. A valve stem assembly for an inflatable tubeless tire mounted on the rim of a wheel comprising a valve stem adapted to extend through a hole in the rim of a wheel, a flange integrally attached to the valve stem extending around the outer circumference of the end of the valve stem inside the rim, the portion of the valve stem immediately adjacent the flange being externally threaded, a bushing nut adapted to extend down through the hole in the rim and further adapted to engage the valve stem by means of internal threads adapted to engage the external threads of the valve stem, a bushing nut flange integrally attached to the outer end of the bushing nut and adapted to engage the rim at the edge portion around the hole, a rounded edge extending around the inner circumference of the bushing nut positioned outside the rim adjacent the bushing nut flange, sealing washers positioned between the rim and the valve stem flange to cooperate with the rim and said flange to create an airtight seal against loss of air from the inflatable tubeless tire.

4. A tubeless tire valve stem assembly comprising a valve stem adapted to extend through a hole in the rim of a wheel, a flange integrally attached to the valve stem extending around the outer circumference of the end of the valve stem inside the rim, a lip integrally attached to the flange extending around its outer circumference, the portion of the valve stem immediately adjacent the flange being externally threaded, an internally threaded bushing nut adapted to extend down through the hole in the rim to thread onto the threads of the valve stem, a flange integrally attached to the outer end of the bushing nut and adapted to engage the rim at the edge portion around the hole, a rounded edge extending around the inner circumference of the bushing nut positioned outside the rim adjacent the bushing nut flange, a pair of sealing washers and a spacer washer, one sealing washer positioned between the rim and the spacer washer, the other sealing washer positioned between the spacer washer and the valve stem flange, the sealing washers and spacer washer held in position by means of the engagement and tightening of the bushing nut threads with the valve stem threads.

5. A tire valve stem assembly for a tubeless tire mounted on the rim of a wheel having a brake drum comprising a valve stem made of bendable materials and adapted to extend through a hole in the rim of a wheel, a flange integrally attached to the valve stem extending around the outer circumference of the end of the valve stem inside the rim, a lip integrally attached to the flange extending around its outer circumference, the portion of the valve stem immediately adjacent the flange being externally threaded, an internally threaded bushing nut adapted to extend down through the hole in the rim to thread onto the threads of the valve stem, a flange integrally attached to the outer end of the bushing nut and adapted to engage the rim at the edge portion around the hole, a rounded edge extending around the inner circumference of the bushing nut positioned outside the rim adjacent the bushing nut flange, a pair of sealing washers and a spacer washer, one sealing washer positioned between the rim and the spacer washer, the other sealing washer positioned between the spacer washer and the valve stem flange, the sealing washers and spacer washer held in position by means of the engagement and tightening of the bushing nut threads with the valve stem threads, the exposed section of said valve stem adapted, after assembly, to be bent close to the rim to avoid interference with the brake drum of the wheel.

References Cited in the file of this patent

UNITED STATES PATENTS

| | | |
|---|---|---|
| 756,246 | Lee | Apr. 5, 1904 |
| 966,023 | Keller | Aug. 2, 1910 |
| 1,191,888 | Glauber | July 18, 1916 |
| 1,788,612 | Benson | Jan. 13, 1931 |
| 1,864,001 | Spicer | June 21, 1932 |
| 2,125,372 | Fox | Aug. 2, 1938 |
| 2,400,930 | Herzegh | May 28, 1946 |
| 2,587,470 | Herzegh | Feb. 26, 1952 |

FOREIGN PATENTS

| | | |
|---|---|---|
| 82,719 | Germany | Nov. 13, 1894 |